United States Patent [19]

Dyhr et al.

[11] 4,242,056
[45] Dec. 30, 1980

[54] ENCAPSULATED REFRIGERATOR

[75] Inventors: Jan Dyhr, Sonderborg; Ole J. Nissen, Augustenborg, both of Denmark

[73] Assignee: Danfoss A/S, Nordborg, Denmark

[21] Appl. No.: 22,985

[22] Filed: Mar. 22, 1979

Related U.S. Application Data

[62] Division of Ser. No. 849,308, Nov. 7, 1977, Pat. No. 4,160,625.

[30] Foreign Application Priority Data

Nov. 8, 1976 [DE] Fed. Rep. of Germany ....... 2650937

[51] Int. Cl.³ .................. F04B 17/00; F04B 35/00; F16L 39/04
[52] U.S. Cl. .................................. 417/363; 417/902; 285/302
[58] Field of Search .................. 417/363, 902; 285/302

[56] References Cited

U.S. PATENT DOCUMENTS

| 381,008 | 4/1888 | Gould | 285/302 X |
|---|---|---|---|
| 2,900,028 | 8/1959 | Hanes | 285/302 X |
| 3,082,936 | 3/1963 | Prucha | 417/902 X |
| 3,155,312 | 11/1964 | Douglas | 417/902 X |
| 3,187,992 | 6/1965 | Roelsgaard | 417/363 |
| 3,396,908 | 8/1968 | Vind | 417/902 X |
| 4,086,032 | 4/1978 | Nishioka | 417/363 |
| 4,101,251 | 7/1978 | Gay et al. | 417/313 |

Primary Examiner—Richard E. Gluck
Attorney, Agent, or Firm—Wayne B. Easton

[57] ABSTRACT

The invention relates to an encapsulated refrigerator assembly of the type in which an integrated motor and compressor unit is resiliently mounted in a hermetically sealed casing or capsule. An oil sump at the bottom of the capsule is provided for lubricating oil. An externally disposed centrifugal separator with an oil collecting tank at the bottom thereof provides refrigerant in vapor form for the compressor and oil for the oil sump. The compressor has an inlet for receiving refrigerant vapor from the separator and the capsule has a single port connected to the separator. A connecting pipe inside the capsule provides fluid communication between the capsule port and the inlet of the compressor. Universal joint fittings at opposite ends of the connecting pipe allow for relative movement between the resiliently mounted motor compressor unit in the capsule and the relatively stationary capsule walls.

6 Claims, 5 Drawing Figures

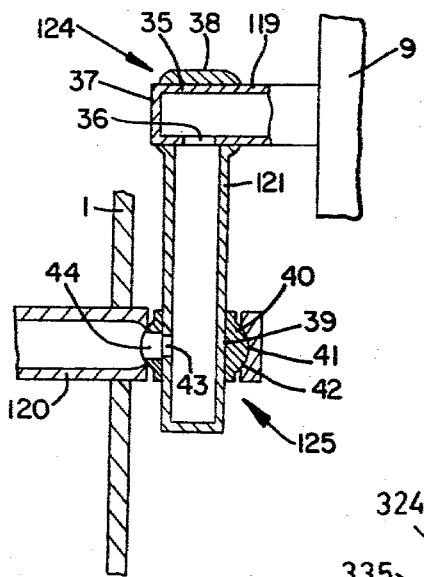
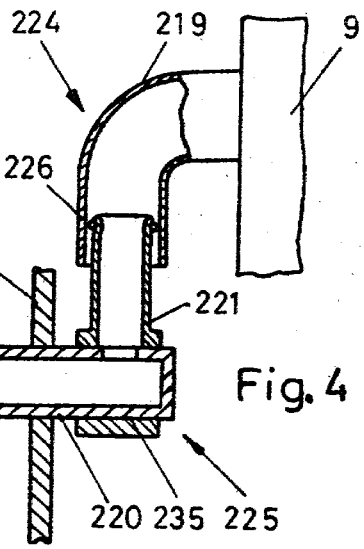
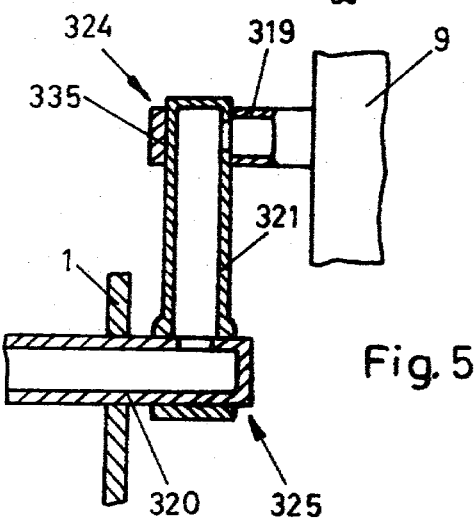

ENCAPSULATED REFRIGERATOR

This is a division of application Ser. No. 849,308, filed Nov. 7, 1977.

The invention relates to a refrigerator with a motor compressor resiliently held in a capsule and a movable pipe coupling between a passage in the capsule wall and a compressor connector.

Refrigerators of this type are known in which the pipe coupling consists of a longish pipe which is helically coiled or bent to meandering shape. In this way it has sufficient flexibility so as not to obstruct the free mobility of the motor compressor in the capsule. For such pipes, adequate space must be provided within the capsule.

This presents particular difficulties in those known constructions where the motor compressor is connected to an aperture in the capsule wall by a longish flexible tube not only on the pressure side but also on the suction side. In addition, the tube has a comparatively large surface area over which heat exchange can take place with the capsule interior.

Constructions are also known in which a conduit element of higher elasticity than conventional metal tubes are included in the part of the pressure conduit lying within the capsule. However, the refrigerant-resistant plastics hoses and metallic bellows elements suggested for this purpose are expensive if they are able to withstand the permanent mechanical stress within the five-year guarantee period, particularly at the joints. The invention is based on the problem of providing a refrigerator of the aforementioned kind in which the pipe coupling between the passage in the capsule wall can be short, space-saving and cheap to make.

This problem is solved according to the invention in that the compressor connector and the passage in the capsule wall comprise pipe connectors which are mutually staggered substantially in the direction of the motor axis, and that a substantially stiff connecting pipe is connected to both pipe connectors by a respective articulated joint.

It is also favourable if a device is provided for compensating axial variations in the spacings of the pipe connectors. In this way it is simple to compensate tolerances in assembly and displacements of the motor compressor parallel to its axis.

The joints also help to prevent vibrations and sounds from being transmitted to the capsule wall from the motor compressor. This effect can also be improved in that an elastic damping element is provided in at least one joint between the connecting pipe and pipe connector. Often the deformability of such a damping element is also sufficient for the movement of the joint.

With particular advantage the joint is formed in that the one pipe member, i.e. the connecting pipe or pipe connector, passes through a transverse hole of the other pipe member and in this region comprises a wall aperture, both pipe members being closed at the end. This results in a joint axis that is identical with the axis of one of the perpendicular pipe members.

Further, the one pipe member may be axially displaceable in the transverse hole of the other pipe member. In this way one can compensate the movements of the motor compressor relatively to the capsule wall in the radial direction or parallel to the motor axis.

In an embodiment that has proved useful, the two pipe connectors are substantially parallel and the one joint has at least one rotary axis which coincides with the axis of the connecting pipe and the other joint has at least one rotary axis coinciding with one pipe connector axis.

In another preferred embodiment, at least one joint is a universal joint, i.e. a joint permitting pivotal motion about more than one axis.

Such a universal joint can be of very simple construcion in that the one pipe member, i.e. connecting pipe or pipe connector, passes through a transverse hole of a sleeve and in this region comprises a wall aperture, as does the sleeve, and the sleeve has a spherical outer face mounted in a spherical receptacle of the other pipe member, both pipe members being closed at the end. Such a sleeve, which may be of elastic material, permits all-sided pivotal motion and possibly also axial displacement of the one pipe member with respect to the other.

A very simple universal joint construction is also obtained in that the pipe connector terminates substantially parallel to the motor axis, the pipe connector and connecting pipe engage over each other with play and carry an elastic sealing ring between each other, particularly an O ring. This sealing ring then serves as sealing, damping and joint element.

Desirably, the sealing ring is held in a peripheral groove of at least one of the adjacent pipe members. This fixes the position of the sealing ring.

The device for compensating axial variations in the spacing of the pipe connectors can be simply constructed in that the connecting pipe is telescopically displaceable with respect to one of the pipe connectors.

This can for example be effected in that the sealing ring held in the peripheral groove of the one pipe member lies against the cylindrically smooth wall of the other pipe member.

In a preferred embodiment, it is ensured that the connecting pipe comprises a section of larger diameter engaging over the pipe connector of the passage, both pipe members comprising a peripheral groove for the sealing ring, and a section of smaller diameter engaging in the pipe connector of the compressor connector, only the connecting pipe having a peripheral groove for the sealing ring whereas the pipe connector has a smooth inner surface. The connecting pipe can be mounted to be axially fixed on the first-mentioned pipe connector. When the motor compressor is subsequently introduced in the capsule from the top, the pipe connector connected thereto can simply be pushed from above over the connecting pipe. The pivot angle of the joint can be relatively small. It should be selected in relation to the length of the connecting pipe so that the motor compressor is freely movable to all sides by 4–8 mm, preferably about 5 mm, relatively to the capsule. Such mobility is entirely adequate for normal operation. If in special cases, e.g. during transport, higher stresses are anticipated, these can be eliminated by known transport abutments or the like.

A mobility of about 5 mm is achieved if, at a spacing of the joints of about 30 mm, the joints permit an angular adjustment of at least 8°. This shows how short the pipe lengths and how small the pivot angles have to be.

In a preferred embodiment, the interior of the capsule is under suction pressure and the pipe coupling is part of the suction conduit. In this construction, the difference between the pressure in the pipe coupling and the pressure in the interior of the capsule is a minimum. The sealing effect of the sealing rings is just as unimportant. It would even be harmless if leakage were to occur. For this reason, one need also not fear that the joint has to be replaced by reason of wearing out of the sealing rings. If the suction gas is passed through the pipe coupling direct to the motor compressor instead of through the interior of the capsule, then this takes place for the purpose of feeding the motor compressor with suction gas that is as cold as possible, whereby the efficiency is increased. If the suction gas must, as is known, flow through a comparatively long pipe section within the capsule, there is the danger that it becomes heated, for example by the pipe section being sprayed with hot cooling oil. With the short pipe coupling here in question, such heating of the suction gas is impossible.

The invention will now be described in more detail with reference to an example shown in the drawing, wherein:

FIG. 3 is an enlarged representation of a second embodiment of the pipe coupling;

FIG. 4 is an enlarged representation of a third embodiment of the pipe coupling, and FIG. 5 is an enlarged representation of a fourth embodiment of the pipe coupling.

Figure 1:
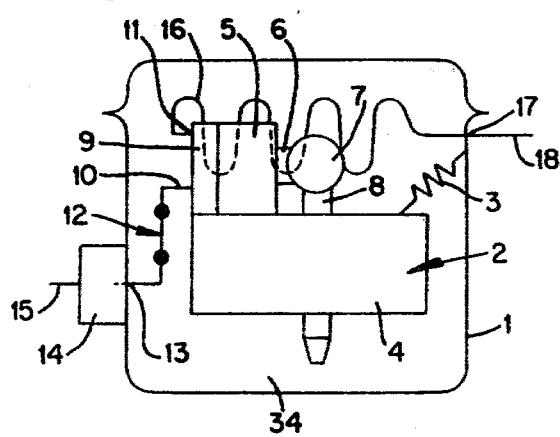
FIG. 1 is a diagrammatic representation of a refrigerator according to the invention.

FIG. 1 shows a capsule 1 in which a motor compressor 2 is suspended from the capsule by means of springs 3. The motor compressor comprises an electric motor 4 and a piston compressor 5 of which the piston 6 is driven by the motor shaft 8 by way of a crank slot 7. A cylinder cover 9 has a connection 10 on the suction side and a connection 11 on the pressure side. The connection 10 on the suction side is connected by a pipe coupling 12 to a capsule passage 13 on the suction side. The latter extends from a liquid separator 14 which is connected to the suction conduit 15 of the plant. The connection 11 on the pressure side communicates by way of a long meandering pressure tube section 16 to a passage 17 on the pressure side of the capsule wall to which the pressure conduit 18 of the plant is connected. The pipe coupling 12 is shown in more detail in FIG. 2. The connection 10 on the suction side is provided with a pipe connector 19 and the passage 13 on the suction side of the capsule wall is provided with a pipe connector 20. These two pipe connectors are parallel to the motor axis and directed towards each other. Between the two pipe connectors there is a connecting pipe 21 which has a section of smaller diameter 22 and a section of larger diameter 23. An articulated joint 24 and 25 is provided at both ends of the connecting pipe 21. The joint 24 comprises an O-sealing ring 26 of refrigerant-resistant material such as polytetrafluoroethylene which is held in a peripheral groove 27 of the connecting pipe 21 and lies with its outer side against the smooth cylindrical inner surface 28 of the pipe connector 19. The lower joint comprises an O-sealing ring 29 of refrigerant-resistant material which is held in a peripheral groove 30 of the pipe connector 20 and in a peripheral groove 31 of the pipe connector 21.

The connecting pipe 21 is pushed over the pipe connector 20 with play 32 and telescopically engages with play 33 in the pipe connector 19. By reason of this play and the resilience of the sealing rings 26 and 29, the pipe connector 19 can be displaced to all sides in a plane perpendicular to the motor axis by an amount of about 5 mm so that, despite the short pipe coupling, adequate mobility of the motor compressor is ensured. Movements of the motor compressor parallel to its axis are absorbed in that the upper sealing ring 26 can slide telescopically along the smooth inner surface 28 of the pipe connector 19. This upper telescopic connection also facilitates assembly because the motor compressor with the pipe connector 19 can simply be pushed on from above. The sealing rings 26 and 29 act as two series-connected damping elements which additionally oppose the transmission of sounds and vibrations from the motor to the capsule wall. In addition, the sealing rings are sealing elements which separate the interior of the pipe coupling from the capsule interior.

In the illustrated embodiment, the capsule interior 34 is under suction pressure by reason of intentionally provided leakage points, so that the seals 26 and 29 are only slightly stressed as far as their sealing effect is concerned and it is also harmless if they should start to leak as a result of wear.

Figure 2:
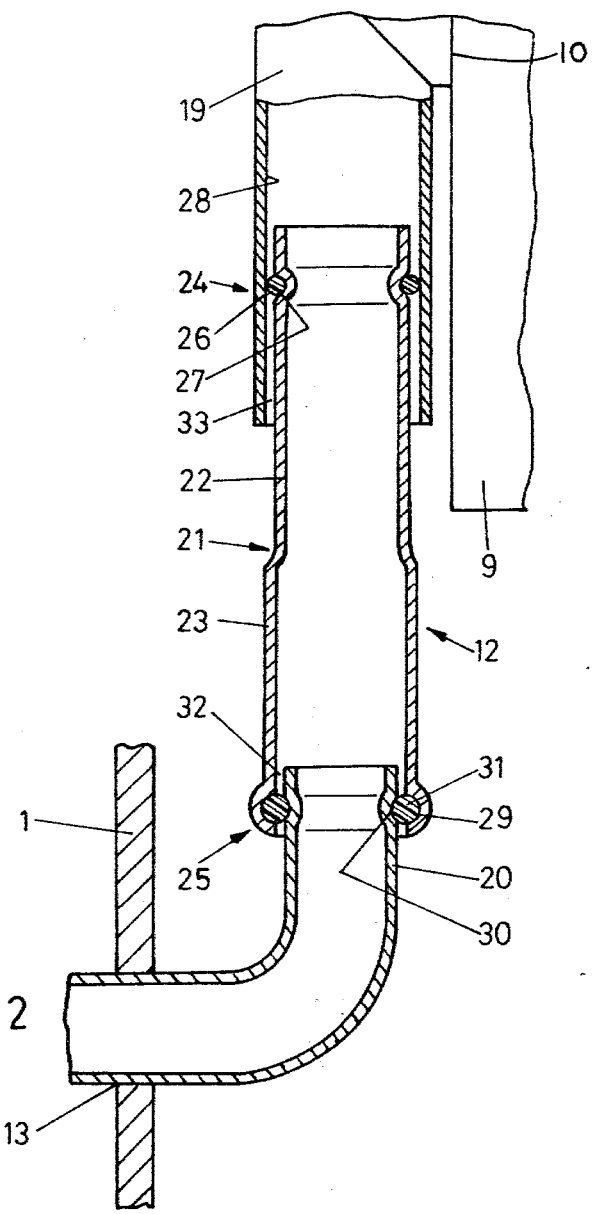
FIG. 2 is an enlarged representation of a first embodiment of the pipe coupling.

In the embodiments of FIGS. 3, 4 and 5, the same reference numerals are used as in FIGS. 1 and 2 for identical parts and reference numerals increased by 100, 200 or 300, respectively, for corresponding parts.

In FIG. 3, the upper joint 124, comprises journal and bearing sections. In the upper joint 124 the pivotal axis coincides with the axis of the horizontal pipe connector 119, is formed in that the connecting pipe 121 has a transverse hole 35 through which the pipe connector 119 passes. In the region of the transverse hole, the pipe connector possesses an aperture 36. End walls 37 and 38 close the end of the pipe connector 119 and connecting pipe 38, respectively. This joint permits horizontal sliding motion as well as pivotal motion.

The lower joint 125 is a universal joint. For this purpose the connecting pipe 121 is mounted in a hole 39 of a sleeve 40 which has a spherical outer surface 41 and is held in a spherical receptacle 42 of the pipe connector 120. Wall apertures 43 in the connecting pipe and 44 in the sleeve 40 are disposed in the region of this transverse hole and constitute the connection to the interior of the pipe connector 120. This joint is pivotable to all sides and permits vertical sliding motion of the connecting pipe 121. The sleeve can be of a rigid material such as metal or of an elastic material such as refrigerant-resistant plastics.

It will be evident that this double joint connection is able to take up movements of the motor compressor in the peripheral direction, in the radial direction and in the vertical direction.

In the FIG. 4 embodiment, the upper joint 224 substantially corresponds to the joint 24 in FIG. 2, so that it will not be described in detail. The lower joint 225 substantially corresponds to the upper joint 124 in FIG. 3 so that a more detailed description of it is also superfluous.

In the FIG. 5 embodiment, the upper joint 324 is similar to the joints 124 and 225 but in this case the connecting pipe 321 passes through a transverse hole 335 in the upper pipe connector 319, so that a pivotal axis is obtained which coincides with the axis of the connecting pipe. The lower joint 325 is identical with the joint 225. It has been found that in this construction with two joints having perpendicular axes and with the simultaneous possibility of displacement of the individual pipe members it is likewise possible to take up all movements of the motor compressor relatively to the capsule 1 within the short displacements that occur during operation.

We claim:

1. An encapsulated refrigerator assembly, comprising, a capsule, an integrated motor and compressor unit resiliently mounted in said capsule with said motor unit having a generally vertically extending axis, a compressor inlet port, an inlet port in said capsule in circumferential alignment with said compressor port but axially and radially offset therefrom relative to said motor axis, pipe fittings for said ports having their free ends in axially offset relation to each other, a connecting pipe between said fittings, upper and lower articulated joint means between said pipe and said fittings, one of said articulated joint means having engaging journal and bearing sections with each said journal section having a hole which provides fluid communication between the interiors of said journal and bearing sections, the other of said articulated joint means forming a telescopic joint to allow telescopic action to compensate for axial variations in the spacings of said fittings and to allow relative axial vibrational movement between said compression unit and said capsule.

2. A refrigerator assembly according to claim 1 wherein one of said articulated joint means has at least one rotary axis which coincides with the axis of said pipe and the other of said articulated joint means has at least one rotary axis coinciding with the axis of the associated one of said pipe fittings.

3. A refrigerator assembly according to claim 2 wherein said journal section is axially displaceable in said bearing section.

4. A refrigerator assembly according to claim 1 wherein the pivot angle for each said articulated joint means is selected in relation to the length of said connecting pipe so that said motor compressor unit is freely movable to all sides by 4 to 8 mm relative to the inside walls of said capsule.

5. A refrigerator assembly according to claim 1 wherein the interior of said capsule is under suction pressure and said pipe connector is part of the suction conduit.

6. A refrigerator assembly according to claim 1 including an elastic damping element provided in at least one of said articulated joint means between said connecting pipe and the associated one of said pipe fittings.

* * * * *